No. 625,109. Patented May 16, 1899.
E. KOENIG & M. L. ERLANGER.
APPARATUS FOR AERATING LIQUIDS, &c., WITH CARBON DIOXID.
(Application filed Feb. 28, 1898.)
(No Model.)
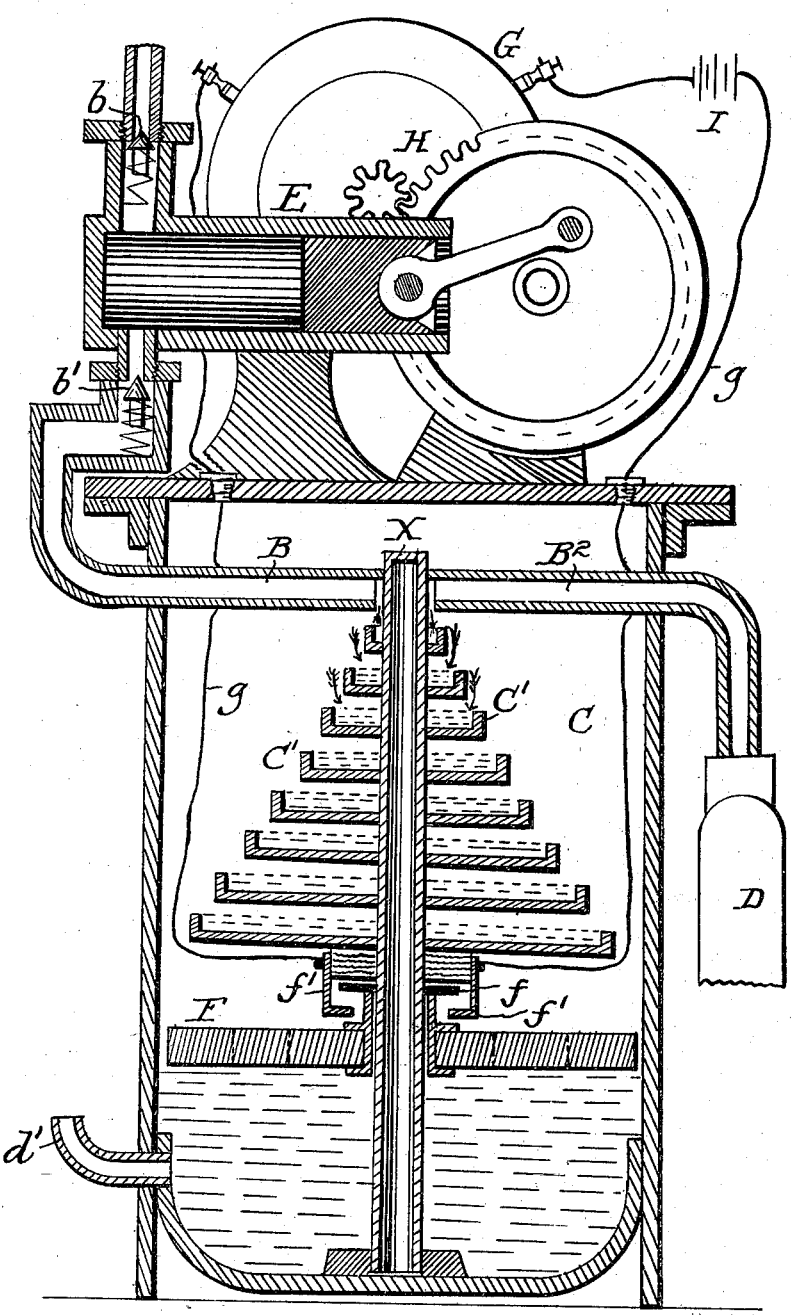

UNITED STATES PATENT OFFICE.

EMIL KOENIG AND MITCHELL L. ERLANGER, OF NEW YORK, N. Y.

APPARATUS FOR AERATING LIQUIDS, &c., WITH CARBON DIOXID.

SPECIFICATION forming part of Letters Patent No. 625,109, dated May 16, 1899.

Application filed February 28, 1898. Serial No. 671,933. (No model.)

*To all whom it may concern:*

Be it known that we, EMIL KOENIG, of New York city, (Long Island City,) borough of Queens, and MITCHELL L. ERLANGER, of New York city, borough of Manhattan, county and State of New York, have invented certain new and useful Improvements in Apparatus for Aerating Liquids and Beverages of all Kinds with Carbonic Dioxid, of which the following is a specification.

The present invention relates generally to apparatus for aerating beverages; and it consists of means by which the feed of the liquid and the aerating of the beverage or the absorption of the gas by the liquid are effected, so that the beverage can be drawn from the apparatus thoroughly saturated with the gas.

Briefly stated, the invention embraces a closed tank, receptacle, or chamber capable of holding a desired quantity of liquid and also more or less filled with gas, such as carbonic-acid gas or carbon dioxid, capable of being absorbed by the liquid. With this tank or chamber is arranged liquid and gas inlets, the pipes of which are connected with any suitable supply—in the case of the gas with a tank containing a quantity of compressed gas and in the case of the liquid-pipe connected with some means, as to an automatically-operative pump, by which the liquid may be forced into the tank against the pressure of the gas therein, examples of other such supply means being illustrated in our applications filed, respectively, on the 19th day of November, 1897, and the 14th day of December, 1897, Serial Nos. 659,210 and 661,894, but preferably of the character hereinafter indicated. With the gas and liquid supply pipes and within the chamber is associated and arranged a pyramidal plurality of flanged disks or vessels which gradually increase in diameter as they approach the bottom of the tank, receptacle, or chamber and being so arranged with respect to one another so far as their diameter is concerned and the uppermost one being so arranged with respect to the discharge-orifices of the gas and liquid pipes that as the gas and liquid are discharged into the tank and upon or into the uppermost vessel such gas and liquid will become more or less intermingled. The more or less gas-saturated liquid after filling such upper vessel will then spill or overflow into the next vessel immediately below it and, filling that vessel, spill or overflow into another lower vessel, and so on until the liquid, more or less saturated with gas, accumulates in the bottom of the tank.

Each vessel will normally contain a more or less constant volume of the liquid that has been supplied to the tank or chamber and when the liquid-feed is not running will absorb the gas in the tank and become more or less saturated therewith; but when the feed is running the incoming liquid supplied to the tank will mix with and displace the saturated liquid in each successive vessel, so that it will fall or overflow over the edges of the flanges of said vessels and will continue to mix with and displace the liquid held by each vessel while the feed continues its supply. In falling from the edges of the flanges of each vessel the liquid passes through an atmosphere of gas under more or less pressure contained in the tank, and it results that such liquid in its step-by-step falling or overflowing movement will become by the time it reaches the last or lowermost vessel thoroughly saturated, so that the liquid collecting at the bottom of the tank will be properly and fully charged with the gas. The liquid falling over the edges of the successive vessels necessarily falls in the nature of a spray or thin film, so that it is so divided up or in a measure atomized that it will more thoroughly absorb the maximum quantity of gas, that is so desirable in these apparatus.

The flanged plates or vessels are shallow, so as to only hold a comparatively small and constant quantity of the liquid, and as said plates are arranged short distances apart, so that the liquid contained in the plates is subjected in shallow layers to the atmosphere of gas contained in the carbonating-chamber, the liquid is constantly presented in condition to better absorb the maximum quantity of gas. By this means the area of gas resting upon the liquid, whether the machine is in motion or at rest, is many times multiplied and increased, the accumulated gas above the level of the last or lowest vessel within the chamber passing freely and continuously between the spaces of the various vessels containing the liquid and around the same instead of the gas resting upon a solid column of liquid, as in other cases, and working upon the surface and gradually through the column until it reaches its base.

The float hereinafter referred to operates to hold the liquid at its level and below the last or lowest of the vessels, thereby confining the liquid below the last or lowest vessel, leaving the entire space above the float for free gas to move around and between the various shallow layers, as aforesaid, the influx of gas being constant and never cut off.

The lower portion of the tank, receptacle, or chamber is provided with a draw-off pipe, so that the beverage may be drawn off from time to time, as may be necessary. The tank or chamber within is furthermore provided with a float arranged with terminals of wires conducting an electric circuit, so that when the float lowers upon the withdrawal of a predetermined quantity of liquid the circuit will be closed and an electric motor caused to run a pump, which forces a required amount of liquid into the chamber to supply that withdrawn therefrom. The motor and pump are supported on the top of the tank or chamber or in any other suitable position.

With this general understanding of the invention, a detailed description thereof will now be given with reference to the accompanying drawings, illustrating a vertical transverse section of a practical embodiment of the invention.

In said drawings the apparatus consists of a closed tank, receptacle, or chamber C, capable of containing a quantity of the aerated beverage or liquid and also a quantity of the gas, which will be under more or less pressure, according to the pressure of the gas-supply tank or of the setting of its reducing-valve. This chamber C is provided with a liquid-supply pipe B and with a gas-supply $B^2$, leading from any suitable source of supply—such, for instance, as is shown in our said pending applications hereinbefore referred to—and the gas-supply pipe leading from a gas-supply tank D, which contains gas under the proper pressure. The chamber is also provided with a draw-off pipe $d'$, arranged near its lower portion, so that the aerated beverage may be drawn off in any suitable manner as it may be required.

The pipes B and $B^2$ are arranged projecting into the tank C in longitudinal actual line with one another and form the uppermost bearing for a vertical stem X, which also forms a division between the two abutting ends of the pipes. Immediately adjacent said stem each of the pipes is provided with an orifice opening downwardly into the chamber C for the passage of the liquid and gas into said chamber.

The vertical stem X, before referred to, supports a number of flange-shaped disks or vessels C', arranged in pyramidal form, the smaller one of the vessels located near the top of the stem and the largermost one near the bottom. These vessels are so arranged that the uppermost one is immediately below the discharge-orifices from the pipes B $B^2$, so that the liquid and gas in passing into the chamber will immediately pass or fall or impinge against said vessel and collect therein to the height of the flange or edge of said vessel and overflowing therefrom will pass into the next lower vessel, and so on until the intermixed gas and liquid is collected in the bottom of the chamber C, from whence it may be withdrawn, as before indicated. The several vessels are so arranged and located a distance apart that the gas accumulating in the chamber under more or less pressure will be in constant contact with the surface of the shallow portions of the liquid which is contained in each of the several vessels. As the liquid discharged into the chamber C falls or overflows from one vessel into another through an atmosphere of gas and while falling being thereby subjected to more or less agitation, it necessarily results that by the time the liquid leaves the last or lowermost vessel it will have become thoroughly impregnated with the gas that is not only being constantly fed into the chamber, but by that contained in the chamber. The liquid therefore at the time it collects at the bottom of the chamber, having passed from its discharge-orifice in a disseminated or spray-like stream and collected in the vessels in shallow layers, will have absorbed the maximum of gas which it is capable of doing, and thus the collected liquid will have become thoroughly saturated with the gas, so that a beverage is formed ready for use in its most perfect state.

In the preferred way of introducing the liquid into the chamber C there is employed an automatically-operative pump E, the operation of which is controlled by a float F, arranged within the chamber. The pump is connected with the liquid-supply pipe B, having the usual inlet and outlet valves $b$ $b'$, the piston of the pump being connected to a suitable motor G, such as the electric motor shown, through suitable gearing H. The float F carries a contact-piece $f$, arranged to make and break contact with a pair of terminals $f'$ in the electric circuit $g$, connected with the motor G and generator I. When the float lowers upon the withdrawal of aerated liquid from the chamber C, its contact-piece $f$ will make contact with the two terminals $f'$, thus closing the electric circuit and causing the electric motor to drive the pump E until the required amount of liquid has been forced into the chamber. As soon as sufficient liquid has been admitted the float rises and breaks the circuit, whereupon the motor stops.

In starting the carbonating operation it may be preferable, there being only air in the chamber, to admit a quantity of gas sufficient to more or less fill the chamber and to let it pass out again through the discharge-orifice. This will expel more or less air from the chamber and leave only gas within, so that the incoming liquid will flow through an atmosphere of gas and collect in the shallow vessels and at the bottom until it reaches the level of the float, whereupon the float will rise and open the circuit, thereby stopping the motor, and the further supply of liquid is cut off. When the pump is not supplying liquid to the tank, the several volumes thereof contained in the flanged vessels C' will be exposed to the atmosphere of gas contained in the tank and will thus become thoroughly saturated with said gas. When the discharge-orifice is opened to discharge a certain amount of the collected aerated liquid, it results that the float will thereby be correspondingly lowered, the circuit closed, and there will be admitted another inflow of liquid into the chamber, and as this inflow takes place the liquid falling from the inlet into the upper vessel mixes with the more or less saturated liquid in the said vessel. The liquid so mixed, flowing over the edge of the vessel to the next one, will be presented in its disseminated condition to the atmosphere of gas contained in the chamber and from this vessel will flow again over the edge into the next one, and so on, so that the liquid finally collecting in the bottom of the chamber will reach the level of the float, when the float will rise and open the circuit, stopping the motor and the further supply of liquid at this stage. The liquid will then have been saturated with the gas and can be withdrawn in its carbonated condition.

What we claim is—

1. In a carbonating apparatus, the combination of a closed tank, chamber or receptacle, a gas and liquid supply leading thereto, means within the chamber for dividing the liquid in shallow layers of constant volumes and the gas constantly filling the free spaces between and around said layers whereby when the liquid-supply is not running the shallow layers are exposed to the action of the gas, and a draw-off pipe, as described.

2. In a carbonating apparatus, the combination of a closed chamber, a supply of gas and liquid thereto, means within the chamber for dividing the inflowing liquid in shallow layers of constant volumes and constantly maintaining the same, means for automatically supplying the necessary liquid to the chamber, and a draw-off pipe, as described.

3. In a carbonating apparatus, the combination of a closed chamber, a supply of gas and liquid thereto, means within the chamber for dividing the liquid in shallow layers of constant volumes and allowing at each fresh supply a quantity of said liquid to pass from one layer to another, means for automatically supplying the necessary liquid to the chamber, and a draw-off pipe, as described.

4. In a carbonating apparatus, the combination of a closed chamber, a supply of gas and liquid thereto, means within the chamber for dividing the inflowing liquid in shallow layers of constant volumes and maintaining them by allowing the superfluous liquid to flow successively from one layer to another and to collect at the bottom, means for automatically stopping the liquid feed-supply and exposing said constant volumes to the action of gas in said chamber, and a draw-off pipe, as described.

5. In a carbonating apparatus, the combination of a closed chamber, a supply of gas and liquid thereto, means within the chamber and above the level of the liquid for dividing the inflowing liquid into shallow layers, each of a constant quantity, and constantly maintaining the same, means for automatically stopping the feed-supply and thereby exposing said layers to the action of the gas in said tank, and a draw-off pipe, as described.

6. In a carbonating apparatus, the combination of a closed tank or chamber, a gas and liquid supply thereto, a plurality of vessels capable of holding a constant quantity of liquid, a float below said vessels, electric wires leading into and out of said chamber, said float carrying the connection between the terminals of said wires, the whole so arranged that the pump is automatically started and stopped when the level of the liquid reaches certain heights, and a draw-off pipe, as described.

7. In a carbonating apparatus, the combination of a closed tank or chamber, a supply of gas thereto, electric wires leading into said chamber, a float therein, a pump operated by an electric motor connected with said wires, all so arranged that on the lowering of the liquid in the chamber the pump will operate and on the rise of the liquid the pump will stop, and a draw-off pipe, as described.

8. In a carbonating apparatus, the combination of a closed tank or chamber, a gas and liquid supply thereto, a plurality of vessels capable of holding a constant quantity of liquid, a float below said vessels connected to control the liquid-supply, and a draw-off pipe, as described.

9. In a carbonating apparatus, a closed tank or chamber provided with gas and liquid inlets and an outlet, a plurality of vessels gradually increasing in diameter and capable of holding a constant quantity of liquid, and means for automatically controlling the supply of liquid to the chamber, as described.

10. In a carbonating apparatus, a closed tank or chamber provided with gas and liquid inlets and an outlet, a plurality of vessels gradually increasing in diameter capable of holding a constant quantity of liquid and mounted on a central vertical stem so that the smallest is uppermost, and means for controlling the feed of liquid to the chamber whereby the liquid contained in said vessels may be exposed to the gas contained in the chamber, as described.

11. In a carbonating apparatus, a closed tank or chamber provided with gas and liquid inlets and an outlet, a plurality of vessels, with unperforated bottoms, gradually increasing in diameter and capable of holding a constant quantity of liquid mounted on a central vertical stem so that the smallest is the uppermost, the next one in size below and some distance from the first, the third below and some distance from the second one, and so on, a float and electrical devices serving to automatically maintain the liquid at a constant level below said vessels and in said tank, as described.

12. In a carbonating apparatus, a closed tank or chamber provided with gas and liquid inlets and an outlet, a plurality of vessels provided with unperforated bottoms gradually increasing in diameter, mounted on a central vertical stem, a float below the vessels provided with means of constantly maintaining the liquid below said vessels and said float, and a free space above the level of the liquid and float to allow the gas to freely circulate between said vessels, as described.

In testimony whereof we have hereunto set our names in the presence of two witnesses.

EMIL KOENIG.
MITCHELL L. ERLANGER.

Witnesses:
   ELEANOR K. HOOPER,
   WALTER A. ROSENBAUM.